(12) United States Patent
Rudolf et al.

(10) Patent No.: US 12,209,441 B2
(45) Date of Patent: Jan. 28, 2025

(54) ACTUATING APPARATUS FOR A FLAP WHICH IS MOUNTED MOVABLY ON A COMPONENT, AND A COMPONENT WITH SUCH AN ACTUATING APPARATUS

(71) Applicant: ILLINOIS TOOL WORKS INC., Glenview, IL (US)

(72) Inventors: Andreas Rudolf, Eibelstadt (DE); Roland Och, Rottendorf (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 367 days.

(21) Appl. No.: 17/672,094

(22) Filed: Feb. 15, 2022

(65) Prior Publication Data

US 2022/0268077 A1   Aug. 25, 2022

(30) Foreign Application Priority Data

Feb. 22, 2021   (DE) ..................... 10 2021 104 132.5

(51) Int. Cl.
*E05B 83/34*   (2014.01)
*E05F 11/04*   (2006.01)
(Continued)

(52) U.S. Cl.
CPC .............. *E05B 83/34* (2013.01); *E05F 11/04* (2013.01); *E05F 11/34* (2013.01);
(Continued)

(58) Field of Classification Search
CPC ........... E05B 83/34; E05F 11/04; E05F 11/34; B60K 2015/0561; E05Y 2201/434;
(Continued)

(56) References Cited

U.S. PATENT DOCUMENTS 5,199,288 A * 4/1993 Merilainen ......... E05B 47/0012
70/279.1
8,353,553 B2 * 1/2013 Beck ...................... B60K 15/05
74/110
(Continued)

FOREIGN PATENT DOCUMENTS

DE     102012004071 A1     9/2013
DE     102014003056 A1 *   9/2015   ............. B60K 15/05
(Continued)

*Primary Examiner* — Eugene G Byrd
*Assistant Examiner* — James Edward Ignaczewski
(74) *Attorney, Agent, or Firm* — THOMPSON HINE LLP

(57) ABSTRACT

An actuating apparatus for a flap which is mounted on a component for movement has a first actuating element, fastenable fixedly to the flap so as to rotate with it, and a second actuating element, fastenable to the component, and rotatable about a first rotational axis, the second actuating element has a first end and a second end, the first end configured to interact with a drive, the second end has a first locking or release geometry, the first actuating element has a second locking or release geometry, the second actuating element can be rotated between a first orientation and a second orientation, wherein the first and second locking or release geometry are configured to interact such that, in the first orientation, the first actuating element is locked to the second actuating element and, in the second orientation, the first actuating element is released from the second actuating element.

16 Claims, 9 Drawing Sheets

(51) Int. Cl.
*E05F 11/34* (2006.01)
*B60K 15/05* (2006.01)

(52) U.S. Cl.
CPC . *B60K 2015/0561* (2013.01); *E05Y 2201/434* (2013.01); *E05Y 2201/484* (2013.01); *E05Y 2201/654* (2013.01); *E05Y 2201/70* (2013.01); *E05Y 2201/702* (2013.01); *E05Y 2201/716* (2013.01); *E05Y 2201/722* (2013.01); *E05Y 2400/3013* (2024.05); *E05Y 2900/534* (2013.01)

(58) Field of Classification Search
CPC ......... E05Y 2201/484; E05Y 2201/654; E05Y 2201/70; E05Y 2201/702; E05Y 2201/716; E05Y 2201/722; E05Y 2800/11; E05Y 2900/534
USPC .......................................................... 292/144
See application file for complete search history.

(56) References Cited

U.S. PATENT DOCUMENTS

| | | | | |
|---|---|---|---|---|
| 8,398,127 | B2* | 3/2013 | Persiani | E05C 19/022 |
| | | | | 292/137 |
| 9,616,745 | B2* | 4/2017 | Beck | E05B 83/34 |
| 2014/0030015 | A1* | 1/2014 | Beck | B60K 15/0406 |
| | | | | 403/349 |
| 2014/0084599 | A1* | 3/2014 | Beck | E05C 19/022 |
| | | | | 292/58 |
| 2015/0008685 | A1* | 1/2015 | Beck | E05B 83/34 |
| | | | | 292/336.3 |
| 2015/0224872 | A1* | 8/2015 | Frommann | B60K 15/05 |
| | | | | 296/97.22 |
| 2019/0093392 | A1* | 3/2019 | Schwab | E05B 81/06 |

FOREIGN PATENT DOCUMENTS

| | | | | |
|---|---|---|---|---|
| DE | 102016001516 B3 | 7/2017 | | |
| FR | 2949394 A1 | * 3/2011 | ............. | B60K 15/05 |

* cited by examiner

ACTUATING APPARATUS FOR A FLAP WHICH IS MOUNTED MOVABLY ON A COMPONENT, AND A COMPONENT WITH SUCH AN ACTUATING APPARATUS

TECHNICAL FIELD

The present invention relates generally to an actuating apparatus for a flap which is mounted on a component such that it can be moved between a closed position and an open position, in particular for a flap which is mounted movably on a recess of a vehicle, as well as a component having a flap which is mounted on a component such that it can be moved between a closed position and an open position, in particular a recess of a vehicle with a flap which is mounted movably thereon, and such an actuating apparatus.

BACKGROUND

Actuating devices for flaps which are mounted on a component such that they can be moved between a closed position and an open position are generally known in the prior art. In this context, for example, reference is made to the publication DE 10 2012 004 071 A1.

In the actuating apparatus known from publication DE 10 2012 004 071 A1, a first actuating part is to be fastened to a flap and is moved with the flap upon movement of the flap between a closed position and an open position. The actuating apparatus further comprises a second actuating part to be fastened to a component. The actuating apparatus further comprises locking means having a locking recess provided on the first or second actuating part and a locking element provided on the other one of the first or second actuating part, wherein the locking element engages with the locking recess upon movement of the first actuating part with the flap from its open position in its closed position, wherein the locking element holds the first actuating part against a spring bias in a locking position on the second actuating part. Further, a remote release means is provided, wherein the remote release means comprises drive means that are actuable from a location remote to the actuating part such that the locking element is retracted from the locking recess, whereby the first actuating part, driven by the spring bias, detaches from the second actuating part and moves at least partially into its open position together with the flap.

The known actuating apparatus from publication DE 10 2012 004 071 A1 is characterized in that the actuating apparatus has a simple and compact structure and can further be remotely released.

In the prior art, however, there is a fundamental need for actuating devices in which several functions can be selected or switched and actuated in coordination. These functions include, in particular, the conventional locking and release of a flap on a component, the opening and closing of flaps against a resistance, for example against a layer of ice or a seal, as well as the locking and release of the flap in an emergency, for example a case in which a drive means used for the conventional locking and release process is no longer operational or has failed.

If at all, these various functionalities can only be implemented in the prior art by means of an actuating apparatus that has a very complex construction and has numerous drive means, for example electric drives, wherein at least one such separate drive means must be provided for each function to be implemented. However, such a configuration results in a relatively large design space that is occupied by the actuating apparatus. However, because in the prior art there is fundamentally a requirement for a simple and compact but robust and reliable construction in order to be able to integrate the actuating apparatus in charging and/or filling recesses of a vehicle, for example, such complex and space-consuming solutions are not usable in modern vehicle concepts.

SUMMARY

Accordingly, the underlying problem of the present invention is to further develop an actuating apparatus of the aforementioned kind in such a way that it requires, on the one hand, a relatively small design space and comprises a few simple components, wherein at the same time several of the aforementioned functions must be executable in a reliable and coordinated manner without having to provide different drive means for the realization of this function. In addition, despite a compact structure of the actuating apparatus, the aim is to reduce the manufacturing costs of the actuating apparatus.

Accordingly, the invention relates in particular to an actuating apparatus for a flap which is mounted on a component such that it can be moved between a closed position and an open position, in particular for a flap which is mounted movably on a recess of a vehicle. The actuating apparatus comprises a first actuating element, wherein it is possible for the first actuating element to be fastened fixedly to the flap so as to rotate with it, and wherein it is possible for the first actuating element to be moved with the flap. The actuating apparatus further comprises a second actuating element, wherein it is possible for the second actuating element to be fastened to the component, and wherein it is possible for the second actuating element to be rotated about a first rotational axis relative to the component. The second actuating element has a first end and a second end which lies opposite the first end in the direction of the rotational axis. The first end is configured in order to interact with a drive means.

For example, the first end can comprise, at least in regions, a toothing system which is configured in order to interact with a complementary toothing system of a drive means.

The second end has, at least in regions, a first locking or release geometry. The first actuating element has, at least in regions, a second locking or release geometry, and the second actuating element is reversibly rotatable between a first orientation and a second orientation via the first end, in particular the toothing system at the first end. The first and second locking or release geometry of the first and second actuating element are configured in order to interact with one another in such a way that, in the first orientation of the second actuating element, the first actuating element is locked to the second actuating element and, in the second orientation of the second actuating element, the first actuating element is released from the second actuating element.

The apparatus according to the invention is in particular characterized in that, via only one movement or rotational motion initiated by a single drive means into the actuating apparatus, in particular the second actuating element, different functions, such as the conventional locking and release of a flap, the locking and release against a resistance, and the locking and release in an emergency, can be realized, wherein the first and second actuating elements have geometries that interact upon the rotational movement initiated by a drive means into the second actuating element such that a flap can be locked and unlocked, and this can occur either automatically or manually.

According to an advantageous further development of the apparatus according to the invention, it is provided that the first locking or release geometry has at least one helical groove, preferably two helical grooves, or at least one projection, preferably two projections. Preferably, the second locking or release geometry has at least one projection, preferably two projections, or at least one helical groove, preferably two helical grooves. The at least one projection is configured in order to interact with the at least one groove, in particular to slide along the at least one helical groove.

Due to the fact that one of the first and second actuating elements comprises the at least one projection, preferably the two projections, and the other of the first and second actuating elements comprises the at least one helical groove, preferably the two helical grooves, an actuating apparatus can be provided in which the first actuating element moves axially along the first rotational axis of the second actuating element relative to the second actuating element via a rotation of the second actuating element, in that the at least one projection slides along in the at least one helical groove. The first actuating element can thereby be fixed or locked in the first orientation of the second actuating element with the second actuating element via the operative connection of the at least one projection and the at least one helical groove and released or unlocked from the second actuating element in the second orientation.

It is thus possible to do without a so-called push-push mechanism and to subject the second actuating element to an overlapping axial and rotational movement. In a state in which the first actuating element is released or unlocked from the second actuating element, the first actuating element, which is connected to a flap, for example a charging or filling flap, continues to move with said flap and fully detaches from the second actuating element, such that a recess, for example a charging or filling recess, of a vehicle is opened or released. The flap can be automatically pivoted into the open position at the moment when the first actuating element is released from the second actuating element, for example via a spring force, via an additional drive means, for example an electric drive, or also via manual actuation.

According to an advantageous further development of the actuating apparatus according to the invention, it is provided that the first orientation of the second actuating element is configured in a point-symmetrical manner with respect to the second orientation of the second actuating element. In this regard, for example, it is conceivable that the first orientation of the second actuating element can be different from the second orientation of the second actuating element by an angle of approximately 180°.

As a result, the locking and release of the first actuating element with the second actuating element can be achieved via a simple rotation of the second actuating element. During this rotation by an angle of approximately 180°, the at least one projection slides along the at least one helical groove. The helical groove is configured such that the projection is fixed in one of the first orientation of the second actuating element via the helical groove and is released in the second orientation of the second actuating element after a rotational movement by approximately 180° from the helical groove such that the first actuating element can move away from the second actuating element with the flap movement.

According to an advantageous further development of the actuating apparatus according to the invention, it is provided that the first actuating element is of sleeve-shaped, in particular bolt-shaped or pot-shaped, configuration with a collar structure and a central cylindrical pin which is surrounded at least in regions by the collar structure. The collar structure and the central cylindrical pin are preferably connected to one another via a connecting web. Further, the second actuating element is configured as a shaft which is designed as a solid shaft or as a hollow shaft.

In particular, it is conceivable that the first locking or release geometry is configured on an outer circumferential face or on an inner circumferential face of the shaft. The second locking or release geometry is configured on an inner circumferential face of the collar structure or on an outer circumferential face of the central cylindrical pin.

Due to this specific geometrical design of the first and second actuating elements of the actuating apparatus, a very compact but efficient construction of the actuating apparatus can be achieved. In a locking position, the second actuating element configured as a shaft is received with the second end, at least in regions, in the first actuating element, which is configured in a sleeve-shaped manner. The configuration of the locking or release geometries can be determined accordingly on the outer walls or outer circumferential faces and inner walls or inner circumferential faces of the actuating elements. This is always done in such a way that two surfaces immediately opposite one another have said geometries and can thus interact.

For this purpose, the at least one projection can be provided on either the first actuating element or on the second actuating element, and the at least one helical groove can be provided on either the second actuating element or on the first actuating element, respectively. It is only important that the at least one projection can always interact with or guide into the at least one helical groove. In this context, in the case of a configuration of the second actuating element as a hollow shaft, the corresponding locking or release geometry can be configured either on an outer circumferential face of the hollow shaft or on an inner circumferential face of the hollow shaft. Accordingly, in a sleeve-shaped configuration of the first actuating element with a collar structure and a central cylindrical pin surrounded at least in regions by said collar structure, the corresponding locking or release geometry can be formed either on an inner circumferential face of the collar structure or on an outer circumferential face of the central cylindrical pin. The arrangement or configuration of the locking or release geometry of the one actuating element thus requires the arrangement or configuration of the locking or release geometry of the other actuating element.

According to an advantageous embodiment of the actuating apparatus according to the invention, it is provided that a surface or a surface region, in particular an outer circumferential face or an outer circumferential face region or an inner circumferential face or an inner circumferential face region, of the first or the second actuating element, on which the first or second locking or release geometry is configured, is of oblique configuration, in the case of a helical configuration at least in regions, in particular in a region of a first or second end of the groove course, and wherein a plane which defines said oblique surface region intersects the first rotational axis of the second actuating element.

Due to this specific, oblique configuration of a surface of the actuating elements in the region of the locking or release geometry in the case of a configuration of the geometry as a helical groove, a manual locking of the first actuating element with the second actuating element can be achieved in an emergency in which the drive means fails. For this purpose, for example, via a manual actuation of the first actuation element or the flap connected to said first actuation element, the first actuation element can be moved axially in the direction of the second actuation element in the direction of the first rotational axis of the second actuation element. Here, the at least one projection, which is different at the other actuating element from the actuating element comprising the helical groove, can slide on the oblique surface at one end of the groove course and thus enter into the locking position without passing through the groove. The second actuating element thus does not need to be rotated in order to lock the first actuating element. Rather, as soon as the drive means is again functional, the special configuration of the helical groove course in the region of a second actuating element can make up for the actual rotation that is necessary for the locking process without blocking the at least one projection in the at least one helical groove. For this purpose, the at least one helical groove is configured such that the at least one projection can slide along a further surface at another end of the groove course and thus be guided back into its initial position in the helical groove, so that a subsequent release process can proceed normally again.

According to a further advantageous embodiment of the actuating apparatus according to the invention, it is provided that the first actuating element is elastically deformable at least in one region in which the first locking or release geometry is formed.

The sliding of the locking or release geometries towards one another in an emergency is thereby particularly advantageously achieved, because the first actuating element can, at least in regions, dodge outwardly or inwardly and thus simplifies the sliding process of the at least one projection along the oblique surface.

According to an advantageous further development of the actuating apparatus according to the invention, it is provided that the actuating apparatus comprises the drive means for moving the second actuating element between the first and the second orientation.

In particular, it is provided that the drive means has a plate and a traction cable which is fastened to the plate, in particular a Bowden cable. The plate can be rotated in a reversible manner counter to or by way of a spring force between a first orientation and a second orientation about a second rotational axis which runs parallel to the first rotational axis. The plate has a toothing system which is of complementary configuration with respect to the toothing system at the first end of the second actuating element and meshes with said toothing system. The first orientation of the plate corresponds to the first orientation of the second actuating element, and the second orientation of the plate corresponds to the second orientation of the second actuating element. The plate can be rotated between its first and second orientation at least by means of the traction cable, in particular the Bowden cable.

Further, it is provided that an axial movement of the traction cable, in particular of the Bowden cable, by approximately 10 mm corresponds to one rotation of the plate between its first and its second orientation.

According to a further advantageous embodiment of the apparatus according to the invention, it is provided that the drive means comprises an electromotive drive, which is directly coupled to the plate and configured in order to rotate the plate between its first and second orientations, or that the drive means comprises an electromotive drive, which is connected to the traction cable, in particular the Bowden cable, and configured in order to rotate the plate between its first and second orientations, preferably via the axial movement of the traction cable, in particular the Bowden cable.

All functions of the actuating apparatus can be reliably and sequentially coordinated via merely one initiated original movement into the plate of the drive means. The initiation of the original movement can be accomplished either directly via an electromotive drive coupled to the plate, or the movement can also be realized via an electromotive drive coupled to the traction cable and thus provided remotely from the actuating apparatus in a vehicle.

The various functionalities of the actuating apparatus can be realized via a variety of positions of the electromotive drive and/or different positions of the traction cable. The plate can be moved between its first and second orientation, and thus initiates movement of the second actuation element between its first and second orientation. However, it is also possible that the traction cable or the electromotive drives can be used to stop the plate in any position between its first and second orientation and/or can only be moved into one of these positions. The electromotive drives are further connected to a controller, so that the different functions of the actuating apparatus can be coordinated with a movement of the flap, or the movements can be initiated sequentially as a function of the movement of the flap and the desired function.

According to a further advantageous embodiment of the actuating apparatus according to the invention, it is provided that the drive means is manually actuable, in particular via a manual axial movement of the traction cable.

Thus, it is possible that, if the electromotive drive or the controller fails, the actuating apparatus ensures an emergency operation in which a manual locking and release of the first actuating element with or from the second actuating element is possible. Preferably, such a manual actuation is carried out via axial movement of the traction cable, in particular the Bowden cable. A driver of a vehicle can, for example, from the vehicle cabin, manually actuate this traction cable, or a connecting or actuating means connected to the traction cable, and thus release the first actuating element from the second actuating element. Locking of the first actuating element with the second actuating element is accomplished via the oblique configuration of the surface of the locking or release geometry by a manually initiated axial movement into the first actuating element or the flap, respectively, as previously described.

According to an advantageous further development of the actuating apparatus according to the invention, it is provided that the actuating apparatus comprises a housing, which is configured in order to be fastened to the component, wherein at least the first end of the second actuating element is received in the housing and the second end of the second actuating element projects from the housing. The second actuating element is mounted in the housing such that it can be rotated about the first rotational axis.

The use of such a housing allows the actuating apparatus to be particularly easily fastened to an adjacent component. Further, the important mechanism is reliably protected against environmental factors, for example moisture or dirt, so that a long service life of the actuating apparatus can be ensured.

According to an advantageous further development of the apparatus according to the invention, it is provided that the components of the actuating apparatus are formed from a plastic or a metal.

Accordingly, depending on the use of and load placed on the various components of the actuating apparatus, a suitable material can be selected that allows for reliable functionality and long life of the apparatus.

According to a further (second) aspect of the invention, a component with a flap which is mounted such that it can be moved between a closed position and an open position, in particular a recess of a vehicle with a flap which is mounted movably thereon, is equipped with at least one actuating apparatus of the aforementioned kind, wherein the first actuating element of the actuating apparatus is fastened to the flap and the second actuating element of the actuating apparatus is fastened to the component.

BRIEF DESCRIPTION OF THE DRAWINGS

An exemplary embodiment of the actuating apparatus according to the invention is described in further detail below, with reference to the accompanying drawings.

The following are shown.

DETAILED DESCRIPTION

Referring now to the illustrations in FIGS. 1 to 11, the actuating apparatus for a flap which is mounted on a component such that it can be moved between a closed position and an open position, in particular for a flap which is mounted movably on a recess of a vehicle, is described.

It should generally be noted that, although the actuating apparatus according to the invention is described below with reference to a vehicle or a vehicle structure or vehicle body, it is also possible to use the actuating apparatus according to the invention with other systems and components that do not relate to a vehicle.

Modern vehicles are powered by either an internal combustion engine, a hybrid drive, or a pure electric drive. In order for such an operation of a vehicle to be possible, the vehicle must be able to be filled and/or charged from the outside. For this purpose, filling and/or charging connections accessible from the outside of the vehicle body are provided, via which the vehicle can be filled and/or charged by connection, for example to a filling station, an electrical charging station, or a conventional electrical home port.

These connectors are usually disposed in a recess of a vehicle or a vehicle body, which is typically covered or locked by a flap or cap that acts as a closure element. This flap can be moved or displaced between a closed position in which the recess of the vehicle is closed and an open position in which the recess of the vehicle is released.

In order to release or lock such a flap for displacement between the closed and open position, the actuating apparatus 1 according to the invention is provided.

Figure 1:
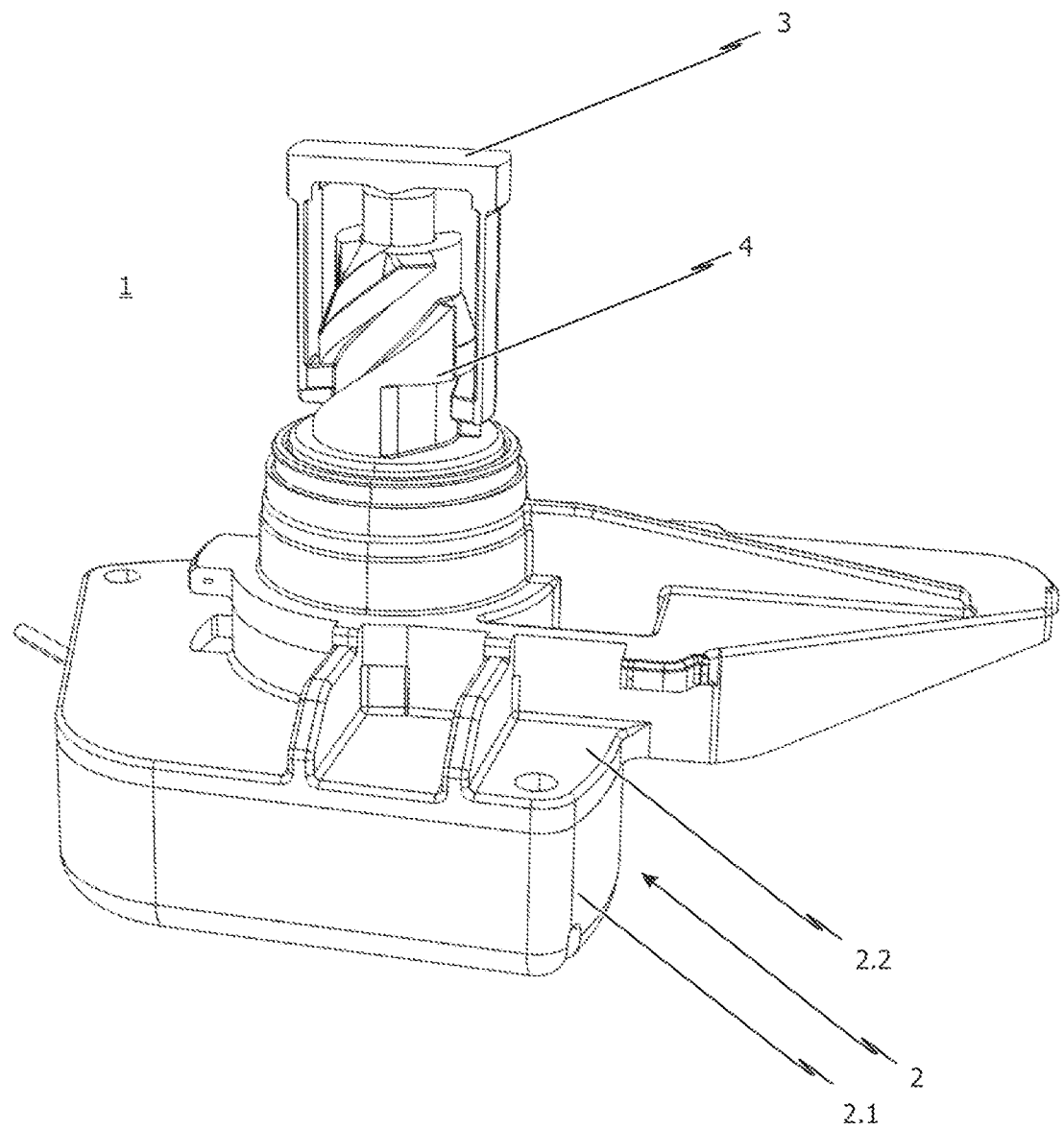
FIG. 1 schematically and in an isometric view, an embodiment of the actuating apparatus according to the invention in a locking position.
Figure 2:
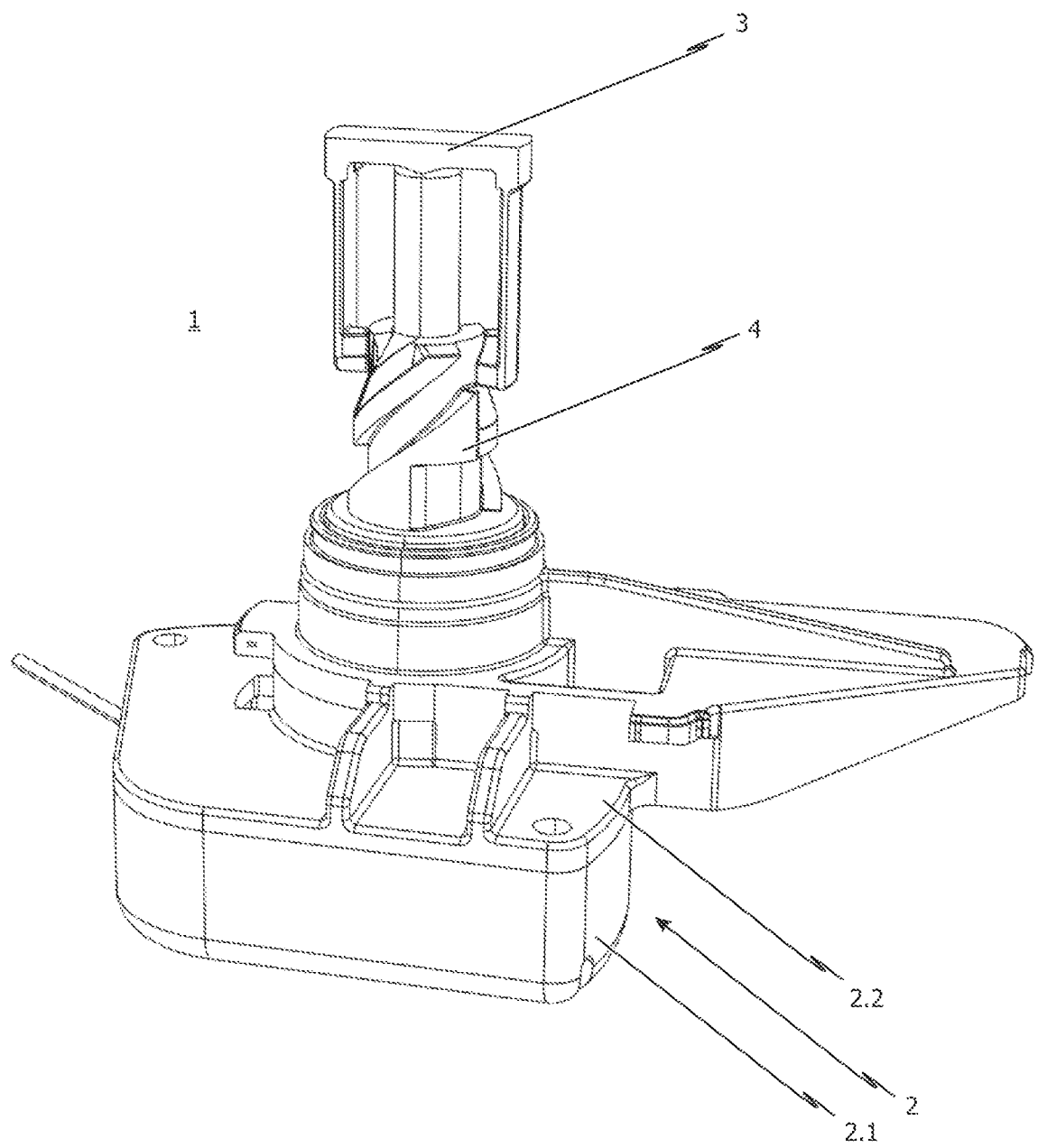
FIG. 2 schematically and in an isometric view, the embodiment of the actuating element according to the invention in a release position.

As can be seen in FIGS. 1 and 2, the actuating apparatus 1 comprises a housing 2 consisting of a first lower housing part 2.1 and a second upper housing part 2.2. The actuating apparatus 1 can be fastened or connected to a component via this housing 2. For example, such a component can be a recess of a vehicle or another component of a vehicle body. Generally speaking, the component can also correspond to a recess or component of another system that is not a vehicle.

The actuating apparatus 1 further comprises a first actuating element 3, which can be fastened or connected to a flap (described above and not shown in the figures) such that the first actuating element 3 can move together with the flap. The actuating apparatus 1 also comprises a second actuating element 4, which can be fastened via the housing 2 to the component (not shown in the figures) and is rotatably mounted in the housing 2 relative to the component and the housing 2 about a first rotational axis.

The second actuating element 2 is preferably configured as a shaft, wherein the shaft can be designed as a solid shaft or as a hollow shaft. The second actuating element 4 can be rotated within the housing 2 between a first orientation and a second orientation about the first rotational axis. The first actuating element 3 is arranged axially movably along or in the direction of the first rotational axis of the second actuating element 4 relative to the second actuating element 4. Upon rotation of the second actuating element 4 about the first rotational axis between the first orientation and the second orientation, the first actuating element 3 is moved axially along the first rotational axis or in the direction of the first rotational axis relative to the second actuating element 4 between a first orientation and a second orientation, respectively. This first orientation represents a locking position of the first actuating element 3 with the second actuating element 4, and the second orientation represents a release position of the first actuating element 3 from the second actuating element 4. FIGS. 1 to 7 show the two different positions of the first actuating element 3 relative to the second actuating element 4.

The first actuating element 3 is preferably of sleeve-shaped, in particular bolt-shaped or pot-shaped, configuration with a collar structure 10 and a central cylindrical pin 11 which is surrounded at least in regions by the collar structure. The collar structure 10 is connected to the central cylindrical pin 11 via a connecting web 12.

Figure 3:
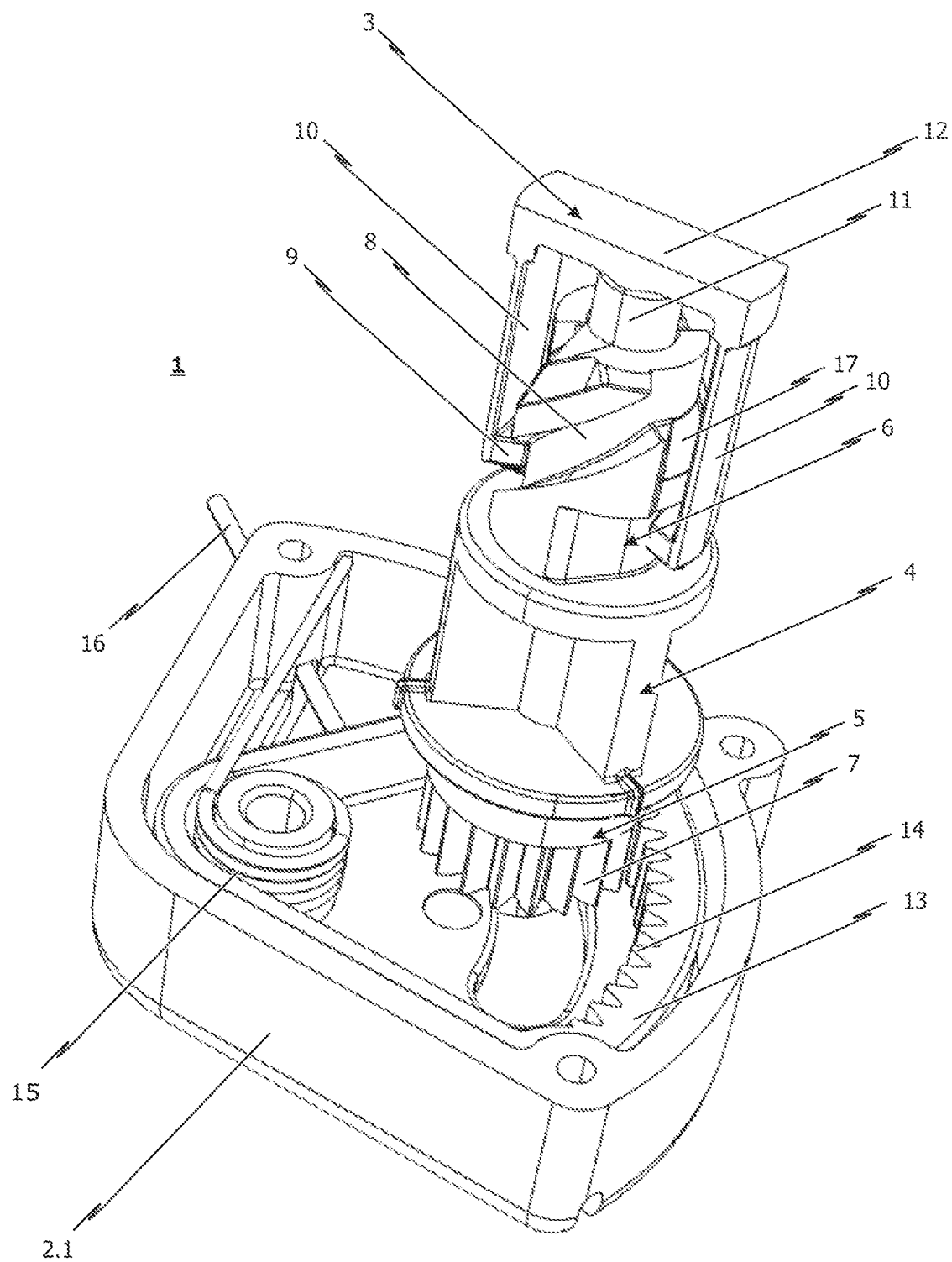
FIG. 3 schematically and in an isometric view, the embodiment of the apparatus according to the invention according to FIG. 1 without a part of the housing.
Figure 4:
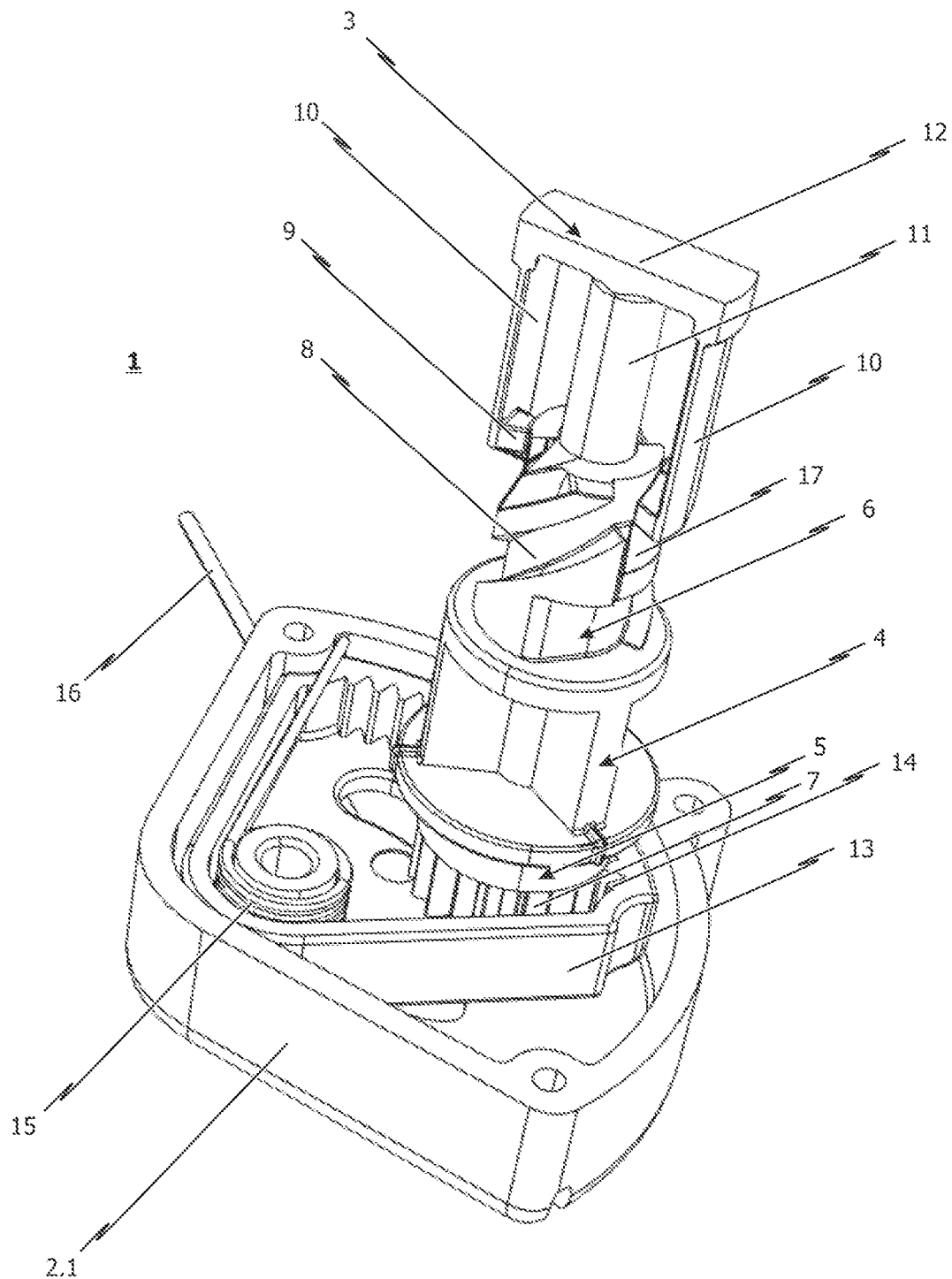
FIG. 4 schematically and in an isometric view, the embodiment of the apparatus according to the invention according to FIG. 2 without a part of the housing.
Figure 5:
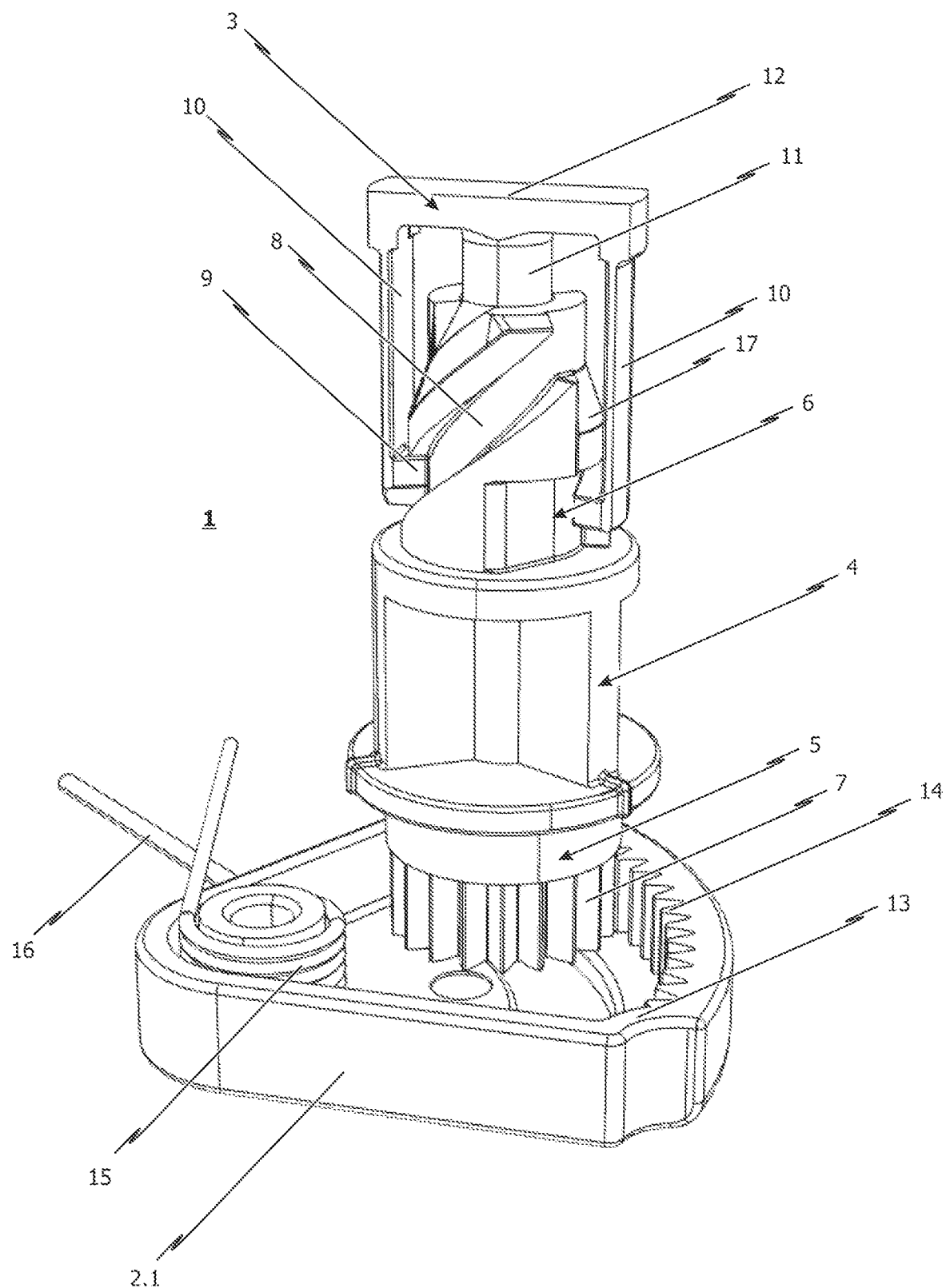
FIG. 5 schematically and in an isometric view, the embodiment of the apparatus according to the invention according to FIGS. 1 and 3 without the housing.
Figure 6:
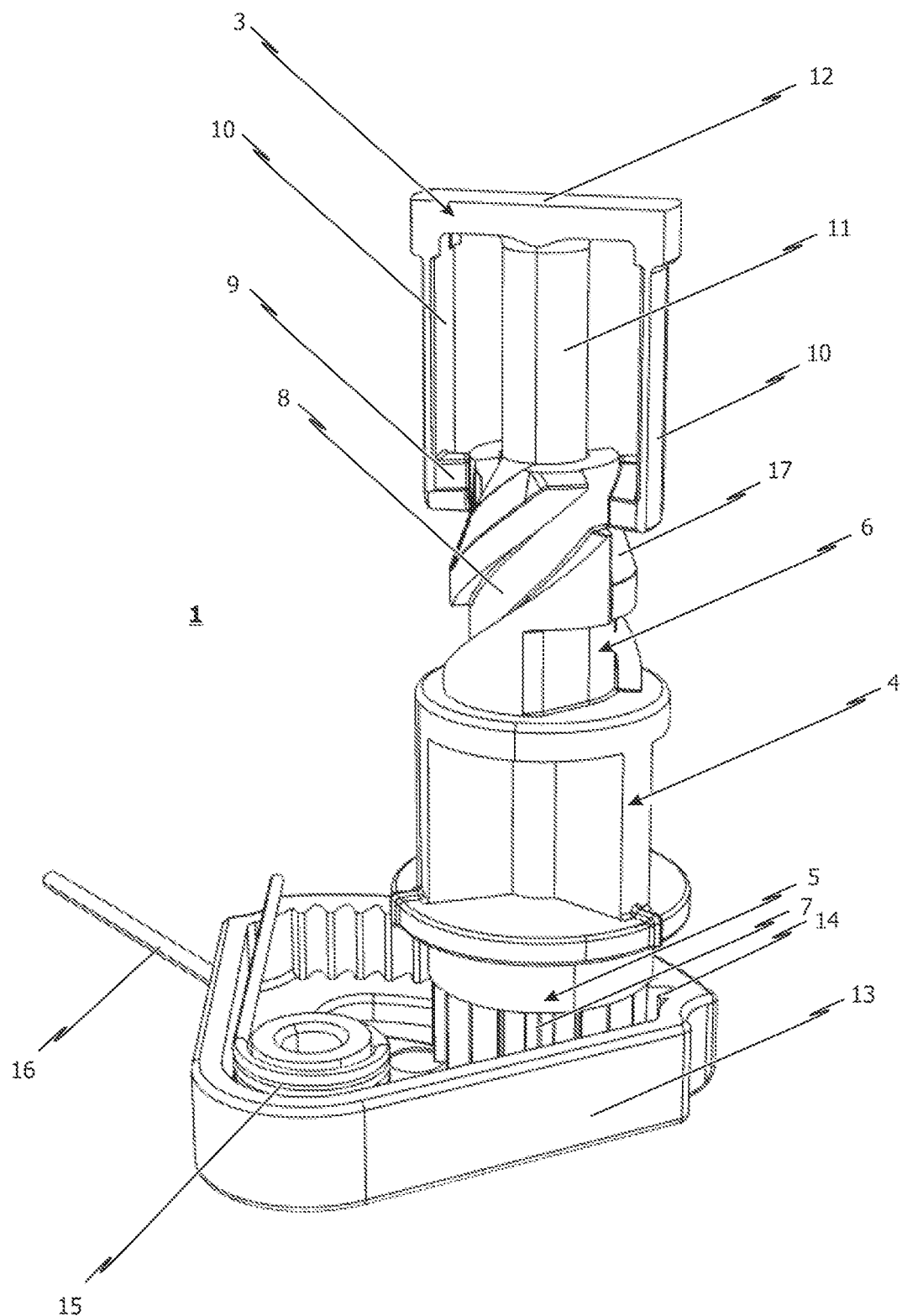
FIG. 6 schematically and in an isometric view, the embodiment of the apparatus according to the invention according to FIGS. 2 and 4 without the housing.
Figure 7:
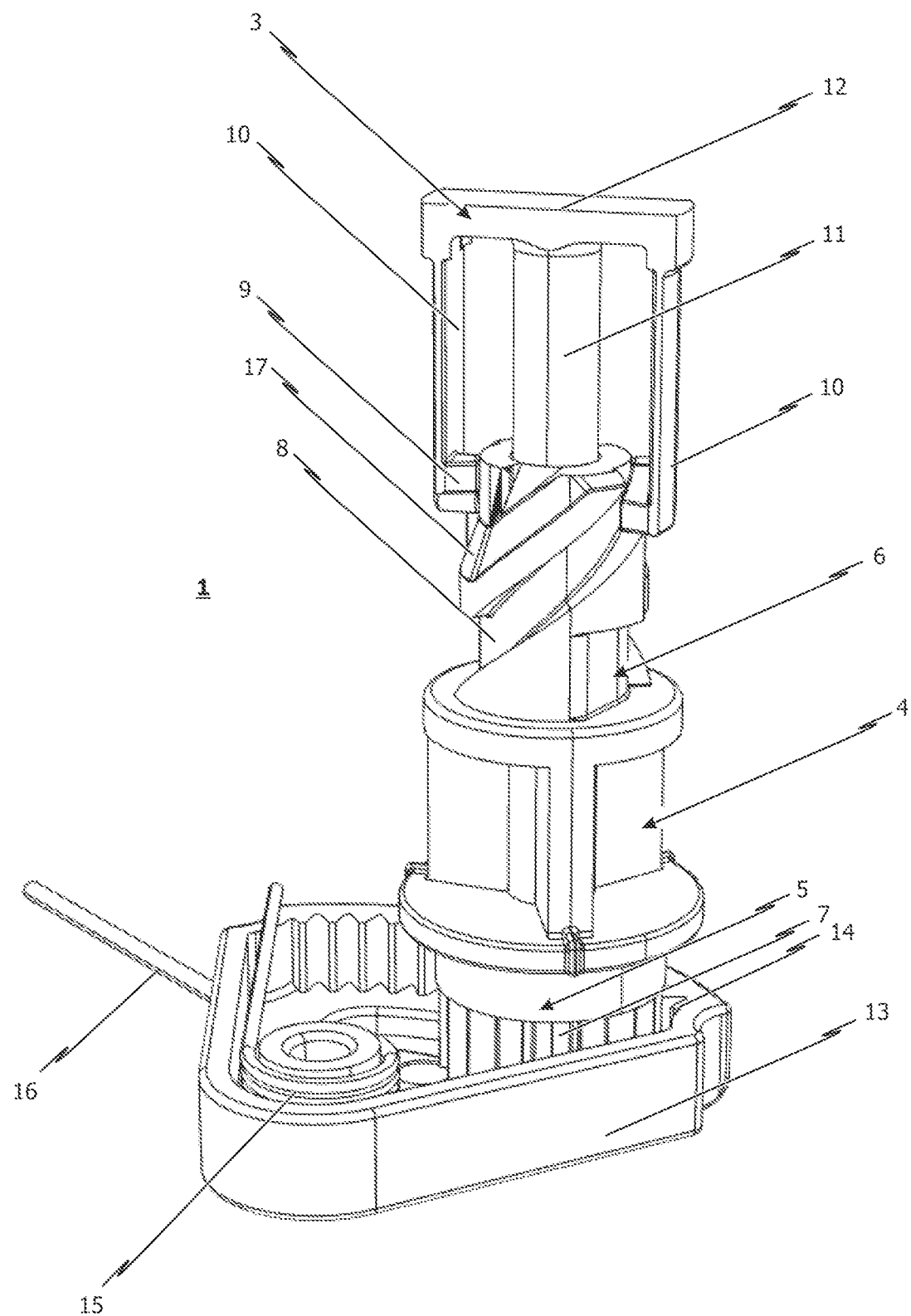
FIG. 7 schematically and in an isometric view, the embodiment of the apparatus according to the invention in an intermediate position without the housing.
Figure 8:
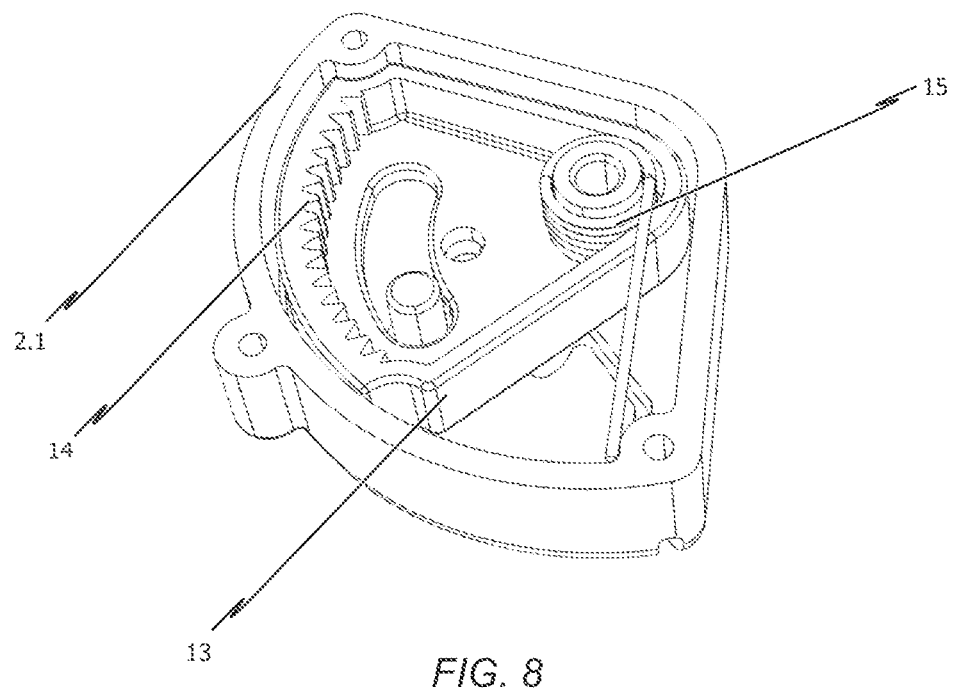
FIG. 8 schematically and in a partial view, the exemplary embodiment of the apparatus according to the invention according to FIG. 1, wherein a part of the drive means is shown in a lower housing part.
Figure 9:
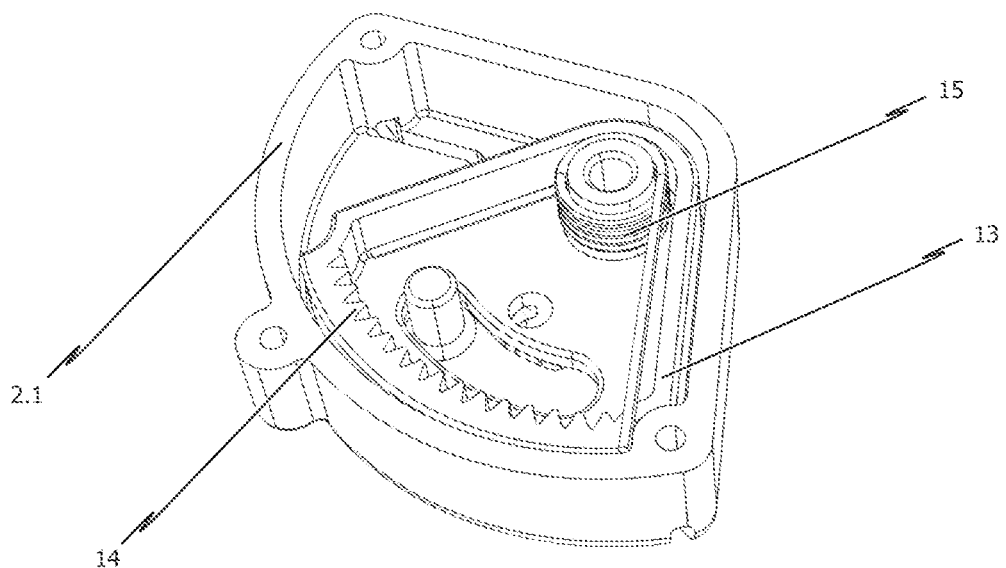
FIG. 9 schematically and in a partial view, the exemplary embodiment of the apparatus according to the invention according to FIG. 2, wherein a part of the drive means is shown in a lower housing part.
Figure 10:
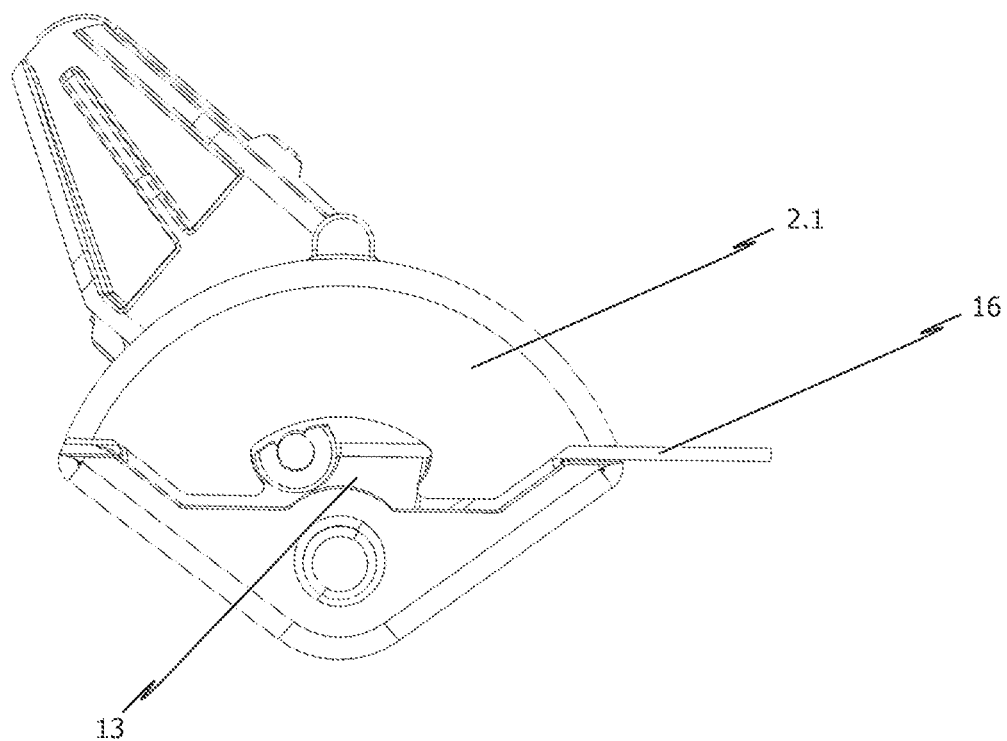
FIG. 10 schematically and in a top plan view, a bottom side of the actuating apparatus according to FIG. 1.
Figure 11:
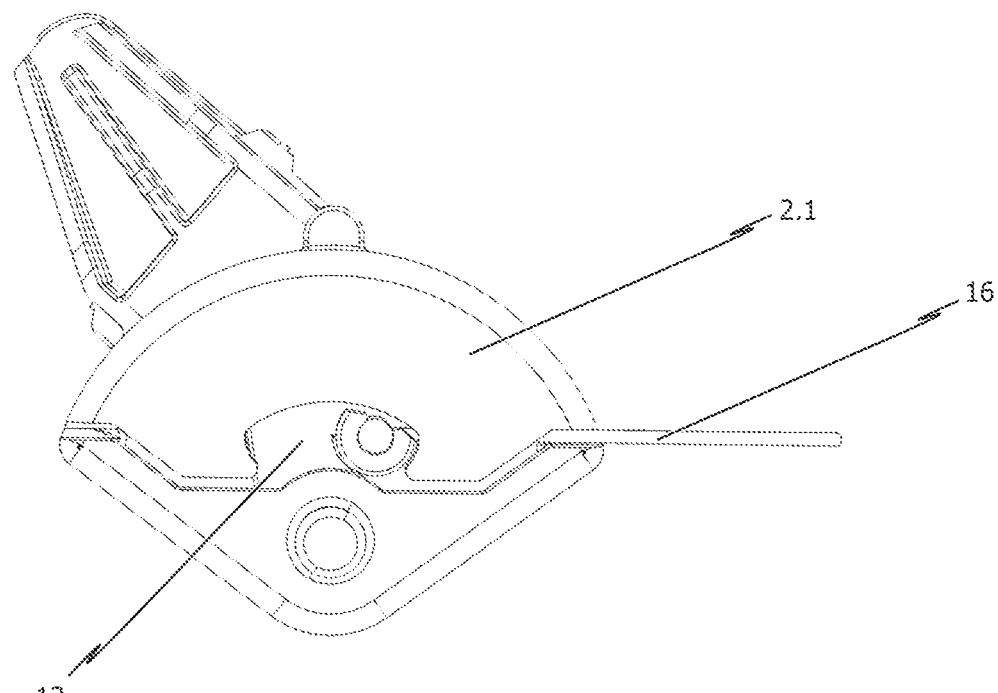
FIG. 11 schematically and in a top plan view, a bottom side of the actuating apparatus according to the invention according to FIG. 2.

Below, on the one hand, the functionality of the actuating apparatus 1 will be explained in more detail, and on the other hand, further features of the actuating apparatus 1 that are necessary for the fulfillment of functions will be described. In this context, for a better understanding, reference is made to FIGS. 3 to 11, in particular. FIGS. 3 and 4 show the actuating apparatus 1 without a representation of the upper housing part 2.2; FIGS. 5 to 7 show the actuating apparatus 1 without the housing 2; FIGS. 8 and 9 show partial views of the actuating devices; and FIGS. 10 and 11 show a top plan view of a bottom side of the housing 2.

The second actuating element 4 has a first end 5 and a second end 6 which lies opposite the first end 5 in the direction of the first rotational axis. At the first end 5, at least in regions, a toothing system 7 is formed, and the first end 5 has, at least in regions, a toothing system 7, which is configured in order to interact with a complementary toothing system 14 of a drive means. The second end 6 of the second actuating element 4 has, at least in regions, a locking or release geometry 8 (first locking or release geometry). The first end 5 and the second end 6 of the second actuating element 4 are connected to one another via an intermediate piece, via which the second actuating element 4 can be mounted in the housing 2.

The first actuating element 3 likewise has, at least in regions, a locking or release geometry 9 (second locking or release geometry). This locking or release geometry 9 forms the counterpart of the locking or release geometry 8 of the second actuating element 4 that corresponds to the locking or release geometry.

The second actuating element 4 is rotatable between the first orientation and the second orientation via the toothing system 7 at the first end 5 of the second actuating element 4 via or by means of a drive means. A rotation of the second actuating element 4 between the first orientation and the second orientation corresponds to a rotation of the second actuating element 4 by an angle of approximately 180°. In order for a rotational movement of the second actuating element 4 to be converted into an axial movement of the first actuating element 3 along the first rotational axis, the locking or release geometries 8, 9 of the first and second actuating elements 3, 4 are configured in order to interact during rotation of the second actuating element 4 between the first and second orientations and to permit a guided axial displacement of the first actuating element 3.

In the first orientation of the second actuating element 4, the first actuating element 3 is locked to the second actuating element 4 such that the first actuating element 3 cannot move axially in the direction of the first rotational axis away from the second actuating element 4. In the second orientation of the second actuating element 4, the first actuating element 3 is released from the second actuating element 4 such that the first actuating element 3 can fully detach and be move away from the second actuating element 4 via the movement of a flap connected to the first actuating element 3.

In order for such a locking and release process to be feasible, the locking or release geometries 8, 9 of the first and second actuating elements 3, 4 are specially configured and shaped. One of the first and second actuating elements 3, 4 comprises at least one helical groove. Preferably, the corresponding locking or release geometry 8, 9 preferably comprises precisely two helical grooves, which are formed circumferentially on a surface, in particular an inner circumferential face or an outer circumferential face, of the corresponding actuating element 3, 4. The other of the first and second actuating elements 3, 4 comprises at least one projection. Preferably, the other of the first and second actuating elements 3, 4 has exactly two projections. The projections are configured in order to interact with the helical grooves. In particular, the projections can slide along the helical grooves and thus move in these grooves.

The helical grooves run in the direction of the first rotational axis along a surface of the respective actuating element 3, 4 and each have a first and a second end. In the case of exactly two helical grooves on the surface of the corresponding actuating element 3, 4, these grooves are offset from one another by an angle of approximately 180° to the other on this surface and also extend respectively over an angle of approximately 180° on the surface. Accordingly, the exactly two projections on the other surface of the other actuating element 4, 3 are also configured in order to be offset from one another by an angle of approximately 180° on this surface.

In the locking position, the second actuating element 4 is in its first orientation and the first actuating element 3 is secured to or with the second actuating element 4 via the groove geometry or the groove course in the locking position. If the second actuating element 4 then moves or is moved into its second orientation, the first actuating element 3 is moved away from the second actuating element 4 via the forced guidance of the locking or release geometries 8, 9 and displaced into the release position in the direction of the rotational axis. From a rotational angle of about 160° of the second actuating element 4 starting from the first orientation of the second actuating element 4 (i.e. first orientation of the second actuating element+160° rotation), the first actuating element 3 can detach from the second actuating element 4 or is released from the second actuating element 4 starting at such a rotational angle, such that the first actuating element 3 can fully detach or move away from the second actuating element 4 via a movement of the flap, for example. Preferably, the first actuating element 3 is no longer in contact with the second actuating element 4 during a rotation of the second actuating element 4 between approx. 160° and approx. 180° starting from the first orientation of the second actuating element 4. Conversely, the first actuating element 3 does not come into contact with the second actuating element 4, for example via a movement of the flap, until a rotation of the second actuating element 4 by about 20° starting from the second orientation of the second actuating element 4 (i.e. second orientation of the second actuating element+20°).

By means of a relatively simple rotational movement of the second actuating element 4, the first actuating element 3 can thus be locked to or on the second actuating element 4 or can be released from the second actuating element 4. A flap of a vehicle can thus be connected to a vehicle structure or vehicle body in such a way that it is not undesirably released and exposes a recess of the vehicle.

As already noted above, the rotational movement of the second actuating element 4 is initiated via a so-called drive means via the toothing system 7. The drive means comprises a plate 13 having a collar structure, wherein a toothing system 14 corresponding to the toothing system 7 is formed on an inner circumferential face of the collar structure. The plate 13 is rotatably mounted in the lower housing part 2.1 of the housing 2 and is biased against the lower housing part 2.2 via a spring 15, in particular a leg spring. A traction cable 16, in particular a Bowden cable, is also fastened to the plate 13.

The plate 13 is rotatably mounted between a first and a second orientation about a second rotational axis in the housing 2, in particular in the lower housing part 2.2, and can be moved between the first and second orientation counter to or by way of a spring force. A driving or rotation of the plate 13 between the first and second orientations can be realized in a variety of ways. On the one hand, a drive unit (not shown in figures), in particular an electromotive drive via which the traction cable 16 is axially movable, can be provided on the traction cable 16, remotely from the actuating apparatus 1. Thus, a rotation of the plate 13 between its first and second orientation is preferably possible via an axial movement of the traction cable 16 by approximately 10 mm. The first orientation of the plate 13 corresponds to the first orientation of the second actuating element 4 and a second orientation of the plate 13 corresponds to the second orientation of the second actuating element 4. When the plate 13 moves out of the first orientation into the second orientation, the plate 13 is rotated or moved against the force of the spring 15, and thus the second actuating element 4 is rotated out of the first orientation into the second orientation and the first actuating element 3 is transferred from a locking position into a release position. In an opposing movement of the plate 13 out of the second orientation into the first orientation, the plate 13 is rotated or moved with the force of the spring 15, and thus the second actuating element 4 is moved out of the second orientation back into the first orientation and the first actuating element 3 is transferred from the release position back to the locking position.

According to a second embodiment, the traction cable 15 is not coupled to a separate drive unit, but rather a drive unit, in particular an electromotive drive, is provided, which is directly coupled to the plate 13 in such a way that the plate 13 can be rotated between its first and second orientation via this drive unit.

The drive units described above are connectable or connected to a controller such that the driving of the plate 13 can be controlled fully automatically. For example, it is possible for the drive units to be instructed via the controller to move the plate 13, either directly or via the traction cable 16, only part of the maximum travel path of the plate 13. This allows the various functions described above to be realized, such as a conventional locking and releasing or a method against resistance (e.g. an ice barrier or seal). The controller also allows the drive units to be controlled, in particular as a function of a flap movement, so that the various movements can proceed sequentially in a coordinated manner and the actuating apparatus 1 or the other components in contact with the actuating apparatus 1 are not destroyed by unintended sequences of movement.

As previously described, it is also possible to achieve the locking and release position of the first actuating element 3 with the second actuating element 4 via manual actuation. This may be necessary, for example, when the previously described driving unit fails, but the actuating apparatus 1 still needs to be locked or released. To enable the first actuating element 3 to be transferred from a release position to the locking position in the event of a failure of a power unit, the actuating apparatus 1 or the actuating element 3, 4, which comprises the helical grooves has a surface or a surface region 17 (or an outer or inner circumferential face or an outer or inner circumferential face region), in particular an obliquely configured surface region located in the region of the first or second end of the groove course. This surface or surface region 17 is obliquely formed such that a plane defining this oblique surface region 17 intersects the first rotational axis of the second actuating element 4. A ramp is thus created on which the other actuating element 4, 3, in particular the projections, can slide along without the second actuating element 4 having to be rotated for this purpose.

In order for this emergency locking function to occur particularly simply and without a high amount of force, the first actuating element is configured in order to be elastically deformable, at least in regions, so that the projections can slide transversely to the first rotational axis during a manual locking process over the previously described oblique surface 17 or the oblique surface region and, in doing so, dodge inward or outward.

On the other hand, it is possible to transfer the first actuating element 3 from a locking position to a release position via a manual actuation or movement of the traction cable 16. For this purpose, the traction cable 16 can simply be pulled, and thus the plate 13 can be moved against the force of the spring 15 from its first orientation to its second orientation, such that the second actuating element 4 rotates out of the first orientation into the second orientation, and thus the first actuating element 3 is released from the second actuating element 4. Alternatively, it is also conceivable that the projections can be moved manually inwardly or outwardly and that the first actuating element 3 is then detached and released from the locking position or from the second actuating element 4 via a pulling, preferably via a pulling of the flap. A movement of the projections inwardly or outwardly can be realized, for example, via an additional component that actuates the projections and in that either the corresponding actuating element 3, 4 is elastically deformable at least in regions or in that the projections are movably mounted on the structure of the actuating elements 3, 4.

It is generally possible to provide the projections or the helical grooves on each of the first or the second actuating elements 3, 4, wherein the projections are always formed on one of these actuating elements 3, 4, and the helical grooves are formed on the other of these actuating elements 4, 2. In the case of a configuration of the second actuating element 4 as a solid shaft, the locking or release geometry 8 is provided on an outer circumferential face of the shaft. If the second actuating element 4 is configured as a hollow shaft, the locking or release geometry 8 can be provided either on an outer circumferential face or on an inner circumferential face of the hollow shaft. Likewise, it is possible that the locking or release geometry 9 of the first actuating element 3 is configured on an inner circumferential face of the collar structure 10 or on an outer circumferential face of the central cylindrical pin 11. Depending on the configuration of the surrounding components, such as a vehicle recess or a vehicle flap, a suitable configuration of the actuating elements 3, 4 can be selected.

The components of the actuating apparatus 1 can be formed from both plastic and a metal. The choice of material can be selected according to the framework conditions in which the actuating apparatus 1 is to be used, so that a high degree of stability and functionality is ensured on the one hand and a long service life is enabled on the other hand.

The aforementioned actuating apparatus 1 can be used together with a component having a flap which is mounted such that it can be moved between a closed position and an open position, in particular a recess of a vehicle having a flap movably mounted thereon. In such a case, the first actuating element 3 of the actuating apparatus 1 is fastened to the flap and the second actuating element 4 of the actuating apparatus 1 is fastened to the component.

In summary, there results an actuating apparatus 1 by means of which a flap can be locked and released on a component. Only by initiating an (exiting) movement into the plate 13 or the second actuating element 4 can a plurality of functions, such as a conventional locking and releasing, a movement against a resistance, and also an emergency operation, be reliably realized without the provision of a large number of complex components and drive means, each of which must be designed for the purpose of its specific functional fulfillment.

The invention is not limited to the exemplary embodiment of the apparatus according to the invention, but rather results when all of the features disclosed herein are considered together.

LIST OF REFERENCE NUMERALS

1 Actuating apparatus
2 Housing 2.1 Lower housing part
2.2 Upper housing part
3 First actuating element
4 Second actuating element
5 First end of the second actuating element
6 Second end of the second actuating element
7 Toothing system
8 Locking or release geometry of the second actuating element
9 Locking or release geometry of the first actuating element
10 Collar structure
11 Central cylindrical pin
12 Connecting web
13 Plate
14 Toothing system of the plate
15 Spring
16 Traction cable
17 Oblique surface or surface region

The invention claimed is:

1. An actuating apparatus for a flap which is mounted on a component such that it can be moved between a closed position and an open position, comprising:
a first actuating element, wherein it is possible for the first actuating element to be fastened fixedly to the flap so as to rotate with it, and wherein it is possible for the first actuating element to be moved with the flap; and a second actuating element, wherein it is possible for the second actuating element to be fastened to the component, and wherein it is possible for the second actuating element to be rotated about a first rotational axis relative to the component,
wherein the second actuating element has a first end and a second end which lies opposite the first end in the direction of the rotational axis,
wherein the first end is configured in order to interact with a drive means with the aid of a mechanism which has a toothing system,
wherein the second end has, at least in regions, a first locking or release geometry,
wherein the first actuating element has, at least in regions, a second locking or release geometry,
wherein it is possible for the second actuating element to be rotated in a reversible manner between a first orientation and a second orientation via the toothing system at the first end, and
wherein the first and second locking or release geometry of the first and second actuating element are configured in order to interact with one another in such a way that, in the first orientation of the second actuating element, the first actuating element is locked to the second actuating element and, in the second orientation of the second actuating element, the first actuating element is released from the second actuating element;
wherein the first actuating element is sleeve-shaped with a collar structure and a central cylindrical pin surrounded, at least in some areas, by the collar structure, and wherein the second actuating element is configured as a solid shaft or a hollow shaft;
wherein the collar structure extends axially along side regions of the pin and is spaced radially outward and away from the side regions of the pin.

2. The actuating apparatus as claimed in claim 1,
wherein the first locking or release geometry has at least one helical groove or at least one projection,
wherein the second locking or release geometry has at least one projection, or at least one helical groove, and wherein the at least one projection is configured in order to interact with the at least one helical groove by sliding along the at least one helical groove.

3. The actuating apparatus as claimed in claim 1,
wherein the first orientation of the second actuating element is configured in a point-symmetrical manner with respect to the second orientation of the second actuating element, and wherein the first orientation of the second actuating element is different from the second orientation of the second actuating element by an angle of approximately 180°.

4. The actuating apparatus as claimed in claim 1,
wherein the collar structure and the central cylindrical pin are connected to one another via a connecting web.

5. The actuating apparatus as claimed in claim 4,
wherein the first locking or release geometry is configured on an outer circumferential face or on an inner circumferential face of the shaft, and
wherein the second locking or release geometry is configured on an inner circumferential face of the collar structure or on an outer circumferential face of the central cylindrical pin.

6. The actuating apparatus as claimed in claim 2,
wherein a surface or a surface region of the first or the second actuating element, on which the first or second locking or release geometry is configured, is of oblique configuration, and wherein a plane which defines said oblique surface region intersects the first rotational axis of the second actuating element.

7. The actuating apparatus as claimed in claim 1,
wherein the first actuating element is elastically deformable at least in one region in which the first locking or release geometry is configured.

8. The actuating apparatus as claimed in claim 1,
wherein the actuating apparatus furthermore has a drive means for moving the second actuating element between the first and the second orientation.

9. The actuating apparatus as claimed in claim 8,
wherein the drive means has a plate and a traction cable which is fastened to the plate,
wherein it is possible for the plate to be rotated in a reversible manner counter to or by way of a spring force between a first orientation and a second orientation about a second rotational axis which runs parallel to the first rotational axis,
wherein the plate has a toothing system which is of complementary configuration with respect to the toothing system at the first end of the second actuating element and meshes with said toothing system,
wherein the first orientation of the plate corresponds to the first orientation of the second actuating element, and the second orientation of the plate corresponds to the second orientation of the second actuating element, and
wherein it is possible for the plate to be rotated between its first and second orientation at least by means of the traction cable.

10. The actuating apparatus as claimed in claim 9,
wherein an axial movement of the traction cable, by approximately 10 mm corresponds to one rotation of the plate between its first and its second orientation.

11. The actuating apparatus as claimed in claim 9,
wherein the drive means has an electromotive drive which is coupled directly to the plate and is configured in order to rotate the plate between its first and its second orientation, or
wherein the drive means has an electromotive drive which is coupled to the traction cable, and is configured in order to rotate the plate between its first and second orientation, via the axial movement of the traction cable.

12. The actuating apparatus as claimed in claim 8, wherein the drive means is manually actuable via a manual axial movement of the traction cable.

13. The actuating apparatus as claimed in claim 1, wherein the actuating apparatus has a housing which is configured in order to be fastened to the component, wherein at least the first end of the second actuating element is received in the housing, wherein the second end of the second actuating element projects out of the housing, and wherein the second actuating element is mounted in the housing such that it can be rotated about the first rotational axis.

14. The actuating apparatus as claimed in claim 1, wherein the components of the actuating apparatus are configured from a plastic or a metal.

15. A vehicle recess with a flap which is mounted such that it can be moved between a closed position and an open position, and with an actuating apparatus as claimed in claim 1, wherein the first actuating element of the actuating apparatus is fastened to the flap and the second actuating element of the actuating apparatus is fastened to the component.

16. An actuating apparatus for a flap which is mounted on a component such that it can be moved between a closed position and an open position, comprising:
   a first actuating element configured to be fastened fixedly to the flap so as to rotate with it, and wherein configured to be moved with the flap; and
   a second actuating element configured to be fastened to the component, and configured to be rotated about a first rotational axis relative to the component,
wherein the second actuating element has a first end and a second end opposite the first end in the direction of the rotational axis,
wherein the first end is configured in order to interact with a drive with the aid of a mechanism which has a toothing system,
wherein the second end has, at least in regions, a first locking or release geometry,
wherein the first actuating element has, at least in regions, a second locking or release geometry,
wherein the second actuating element is rotatable in a reversible manner between a first orientation and a second orientation via the toothing system at the first end, and
wherein the first and second locking or release geometry of the first and second actuating element are configured in order to interact with one another such that, in the first orientation of the second actuating element, the first actuating element is locked to the second actuating element and, in the second orientation of the second actuating element, the first actuating element is released from the second actuating element;
wherein the actuating apparatus furthermore has the drive means for moving the second actuating element between the first and the second orientation;
wherein the drive means has a plate and a traction cable which is fastened to the plate,
wherein it is possible for the plate to be rotated in a reversible manner counter to or by way of a spring force between a first orientation and a second orientation about a second rotational axis which runs parallel to the first rotational axis,
wherein the plate has a toothing system which is of complementary configuration with respect to the toothing system at the first end of the second actuating element and meshes with said toothing system,
wherein the first orientation of the plate corresponds to the first orientation of the second actuating element, and the second orientation of the plate corresponds to the second orientation of the second actuating element, and
wherein it is possible for the plate to be rotated between its first and second orientation at least by means of the traction cable.

* * * * *